(12) United States Patent
Yasunaga

(10) Patent No.: US 10,639,942 B2
(45) Date of Patent: May 5, 2020

(54) PNEUMATIC TIRE

(71) Applicant: TOYO TIRE & RUBBER CO., LTD., Osaka-shi, Osaka (JP)

(72) Inventor: Toshikazu Yasunaga, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 413 days.

(21) Appl. No.: 15/446,103

(22) Filed: Mar. 1, 2017

(65) Prior Publication Data

US 2018/0009272 A1 Jan. 11, 2018

(30) Foreign Application Priority Data

Jul. 8, 2016 (JP) ................................. 2016-136167

(51) Int. Cl.
*B60C 13/02* (2006.01)

(52) U.S. Cl.
CPC .................................. *B60C 13/02* (2013.01)

(58) Field of Classification Search
CPC ..... B60C 13/00; B60C 13/001; B60C 13/002; B60C 13/02; B60C 13/023
See application file for complete search history.

(56) References Cited

FOREIGN PATENT DOCUMENTS

| CN | 104275992 A | 1/2015 |
| JP | 11-291722 A | 10/1999 |
| JP | 2015013605 | * 1/2015 |

OTHER PUBLICATIONS

Office Action dated Dec. 21, 2018, issued in counterpart CN Application No. 201710083334.3, with English translation. (13 pages).
Office Action dated May 30, 2019, issued in counterpart CN Application No. 201710083334.3, with English translation. (11 pages).

* cited by examiner

*Primary Examiner* — Justin R Fischer
(74) *Attorney, Agent, or Firm* — Westerman, Hattori, Daniels & Adrian, LLP

(57) ABSTRACT

A pneumatic tire has a first region including a plurality of first zones disposed adjacently to each other in a tire circumferential direction, each first zone being formed in a closed region and extending in a first extending direction; and a second region which is disposed adjacently to the first region in a tire radial direction and includes a plurality of second zones, each second zone being disposed adjacently to each other in a tire circumferential direction, being formed in a closed region and extending in a second extending direction. On an end portion of the first region disposed adjacently to the second region, valley portions are formed by the first zones disposed adjacently to each other in the tire circumferential direction. Each of the second zones has a portion disposed adjacently to the first region and configured to mate with each of the valley portions.

3 Claims, 7 Drawing Sheets

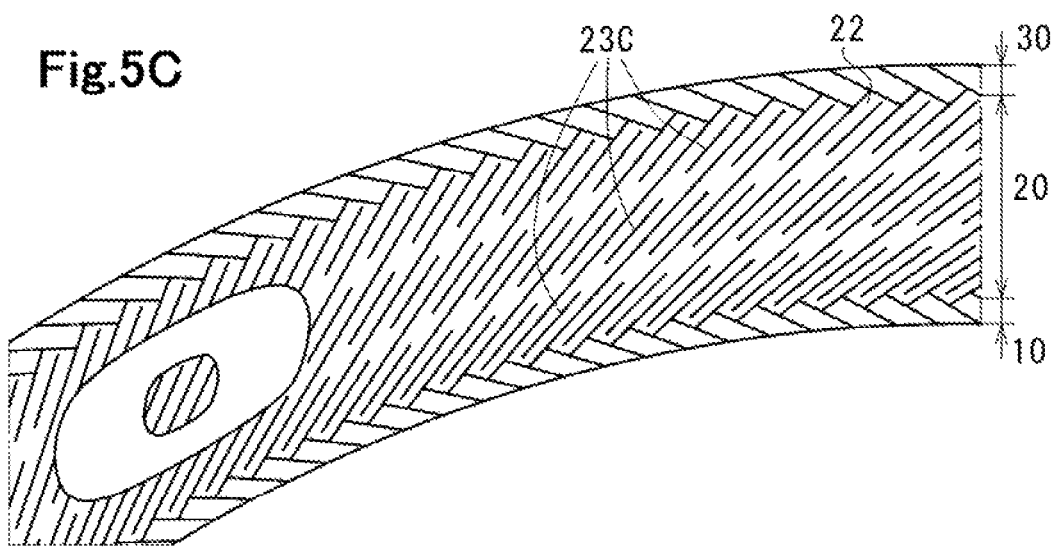
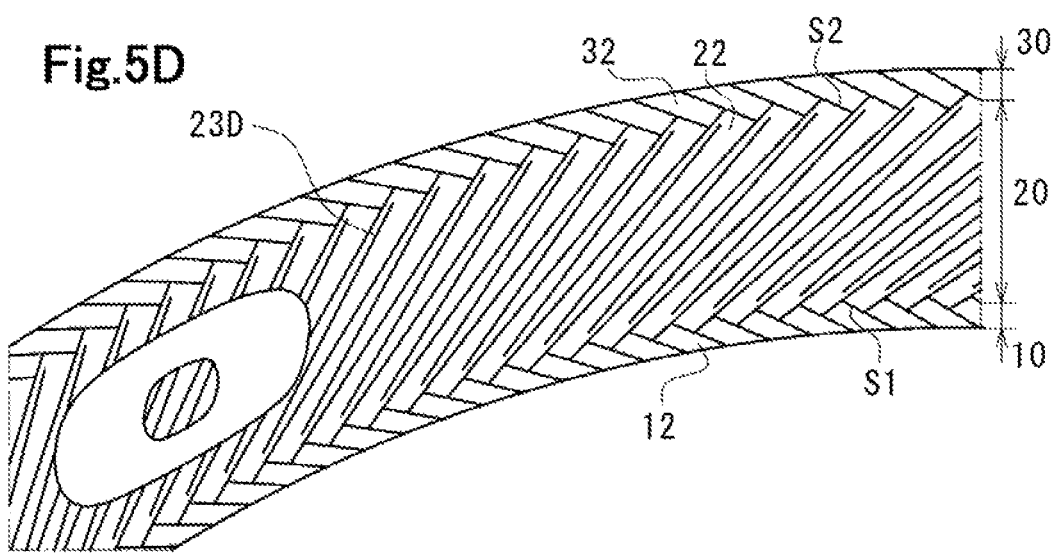

PNEUMATIC TIRE

CROSS-REFERENCE TO RELATED APPLICATIONS

This application claims priority of Japanese Patent Application No. 2016-136167 filed on Jul. 8, 2016, the content of which is incorporated herein by reference.

BACKGROUND OF THE INVENTION

Technical Field

The present invention relates to a pneumatic tire.

Related Art

A pneumatic tire is formed in such a manner that various kinds of strip-like tire constitutional members are wound in a circular annular shape on a peripheral portion of a shaping drum and are expanded in a toroidal shape thus forming a green tire, and the green tire is vulcanized. After vulcanization, on tire side portions of the tire, a joint portion where a winding start portion and a winding finish portion of the strip-like tire constitutional members are bonded to each other is likely to locally appear as an uneven surface, and such an uneven surface causes lowering of quality of external appearance of the tire.

Conventionally, to make such a local uneven surface less conspicuous, there has been known a technique where a serration formed of a large number of ridges is formed on the tire side portions (see JP-A-11-291722, for example).

SUMMARY

Recently, to satisfy a demand for reduction of a weight of a tire, the reduction of wall thickness of a tire side portion has been studied. However, when the wall thickness of the tire side portion becomes thin, an uneven surface of the tire side portion becomes further conspicuous and rigidity of the tire side portion is also lowered.

It is an object of the present invention to provide a pneumatic tire which can make an uneven surface of a tire side portion less conspicuous while enhancing rigidity of the tire side portion.

According to one aspect of the present invention, there is provided a pneumatic tire which has a first region of a tire side portion including a plurality of first zones disposed adjacently to each other in a tire circumferential direction, each of the first zones being formed in a closed region defined by a first ridge set which surrounds a periphery of the first zone and extending in a first extending direction inclined with respect to a tire radial direction; and a second region of the tire side portion which is disposed adjacently to the first region in a tire radial direction and includes a plurality of second zones, each of the second zones being disposed adjacently to each other in a tire circumferential direction, formed in a closed region defined by a second ridge set which surrounds a periphery of the second zone and extending in a second extending direction which differs from the first extending direction. On an end portion of the first region disposed adjacently to the second region in the tire radial direction, valley portions are formed by the first zones disposed adjacently to each other in the tire circumferential direction. Each of the second zones has a Portion disposed adjacently to the first region in the tire radial direction and configured to mate with the valley portions.

That is, each of the second zones has a portion disposed adjacently to the first region in the tire radial direction and the portion is meshed with the valley portion in the tire radial direction.

According to the present invention, by forming the first region formed of the plurality of first zones each of which is formed in the closed region and the second region formed of the plurality of second zones each of which is formed in the closed region in the tire side portion, unevenness on the tire side portion can be made less conspicuous and rigidity of the tire side portion can be enhanced. In addition to such advantageous effects, by arranging the second zones such that the second zones are meshed with the first zones in a tire radial direction to mate with the valley portions formed by the first zones disposed adjacently to each other in the tire circumferential direction, the first zones and the second zones are disposed in a muriform shape in the tire radial direction so that rigidity of the tire side portion can be further enhanced. Further, the boundary portion between the first region and the second region can be formed such that the boundary portion extends in a zigzag shape in the tire circumferential direction. Accordingly, a load applied to the tire side portion can be easily dispersed in the tire radial direction and in the tire circumferential direction and hence, rigidity of the tire side portion can be further effectively enhanced.

Preferably, an inner ridge is formed inside of one of the first and second zones which is longer in the extending direction than the other. The inner ridge is extending in the extending direction of the longer zone.

With such a configuration, by forming the inner ridge inside the zone which is formed in a more elongated manner in the extending direction, rigidity of the zone in the extending direction can be effectively enhanced. Accordingly, it is possible to suppress lowering of rigidity of the zone where rigidity is likely to be lowered because of being formed in a more elongated manner in the extending direction.

Preferably, the inner ridge is connected to neither the first ridge set nor the second ridge set.

With such a configuration, the inner ridge is connected to neither the first ridge set nor the second ridge set and hence, the inner ridge can be formed as an independent ridge. Accordingly, when the inner ridge is connected to the other ridges, it is possible to prevent a local excessive increase of rigidity at the portion the inner ridge is connected to the other ridges. Since there is no stress concentration on the other portions attributed to the local high rigidity portion, durability can be maintained. Further, by forming the inner ridge as the independent ridge, a length of the inner ridge can be shortened and hence, it is possible to suppress the increase of rubber volume.

According to one aspect of the present invention, there is provided a pneumatic tire which includes: a first region of a tire side portion where a plurality of first ridges are disposed parallel to each other in a tire circumferential direction, each of the first ridges extending in a first extending direction inclined with respect to a tire radial direction; and a second region which is disposed adjacently to the first region in a tire radial direction and includes a plurality of second ridges, each of the second ridges extending in a second extending direction which intersects with the first extending direction and being disposed parallel to each other in the tire circumferential direction. Each of the plurality of second ridges extends toward the second extending direction from middle portion of a corresponding first ridge in the tire radial direction via end portion in the tire radial direction of the other first ridge disposed adjacently to the corresponding first ridge in the tire circumferential direction.

According to the pneumatic tire of the present invention, by disposing the first zones and the second zones in a muriform shape in the tire radial direction, it is possible to make unevenness of the tire side portion less conspicuous while enhancing rigidity of the tire side portion.

BRIEF DESCRIPTION OF THE DRAWINGS

The foregoing and the other features of the present invention will become apparent from the following description and drawings of an illustrative embodiment of the invention in which:

FIG. 5C is a partial side view of the pneumatic tire showing a modification of the third ridge;

FIG. 5D is a partial side view of the pneumatic tire showing a modification of the third ridge;

DETAILED DESCRIPTION OF EMBODIMENTS

Hereinafter, an embodiment of the present invention is described with reference to attached drawings. The description made hereinafter merely shows an example essentially, and does not intend to limit the present invention, products to which the present invention is applied, or its applications. Further, drawings are schematically shown and hence, ratios of respective sizes and the like may differ from actual ratios of sizes and the like.

Figure 1:
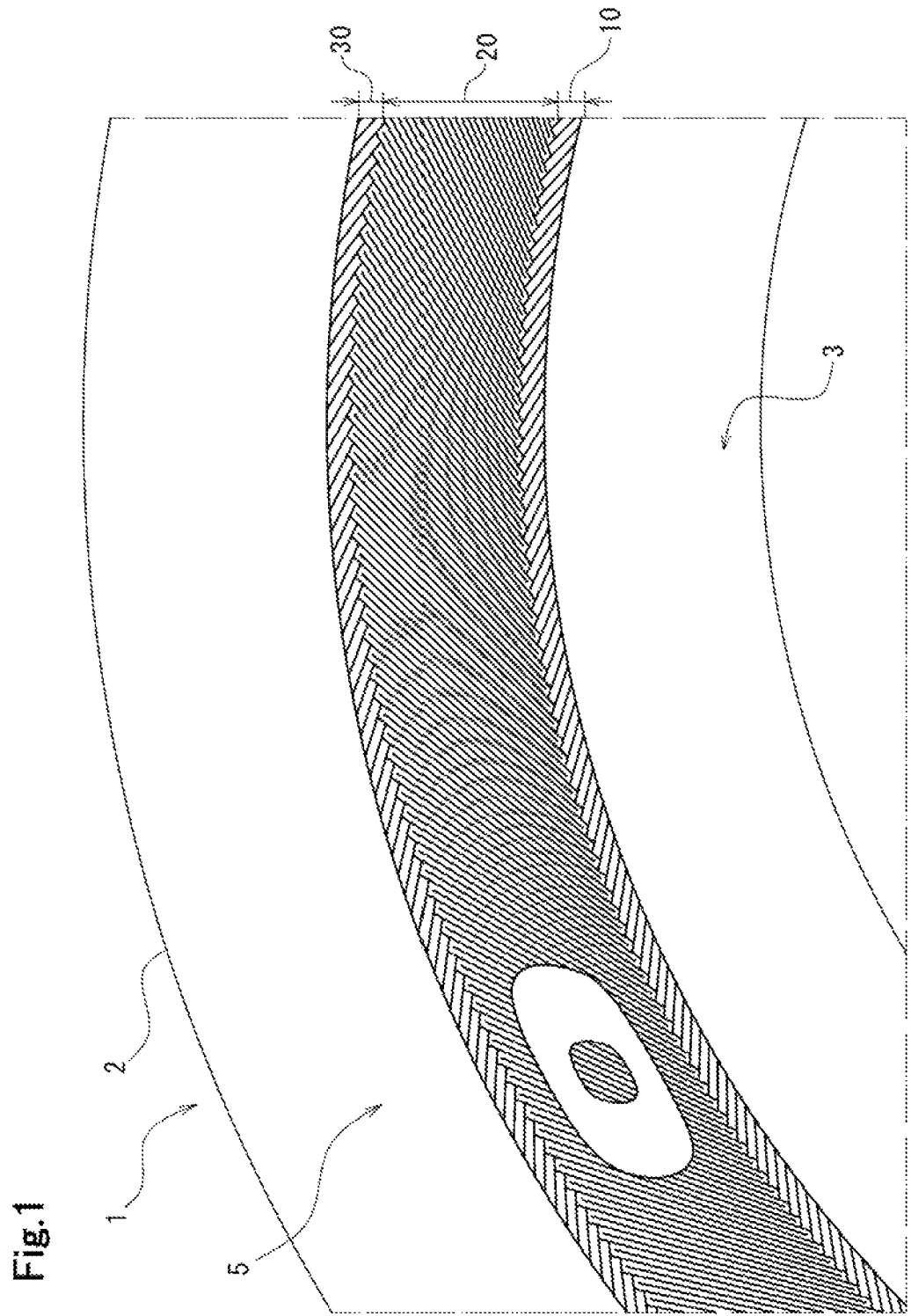
FIG. 1 is a partial side view of a pneumatic tire according to one embodiment of the present invention.

FIG. 1 is a partial side view of a pneumatic tire 1 according to one embodiment of the present invention. As shown in FIG. 1, the pneumatic tire 1 has a tread portion 2 positioned on an outer diameter side in the tire radial direction, bead portions 3 positioned on an inner diameter side in the tire radial direction, and tire side portions 5 positioned between the tread portion 2 and the bead portions 3 in the tire radial direction. In the tire side portion 5, a first region 10, a second region 20 and a third region 30 which respectively have a circular annular shape are disposed adjacently to each other in order from an inner diameter side in the tire radial direction.

Figure 2:
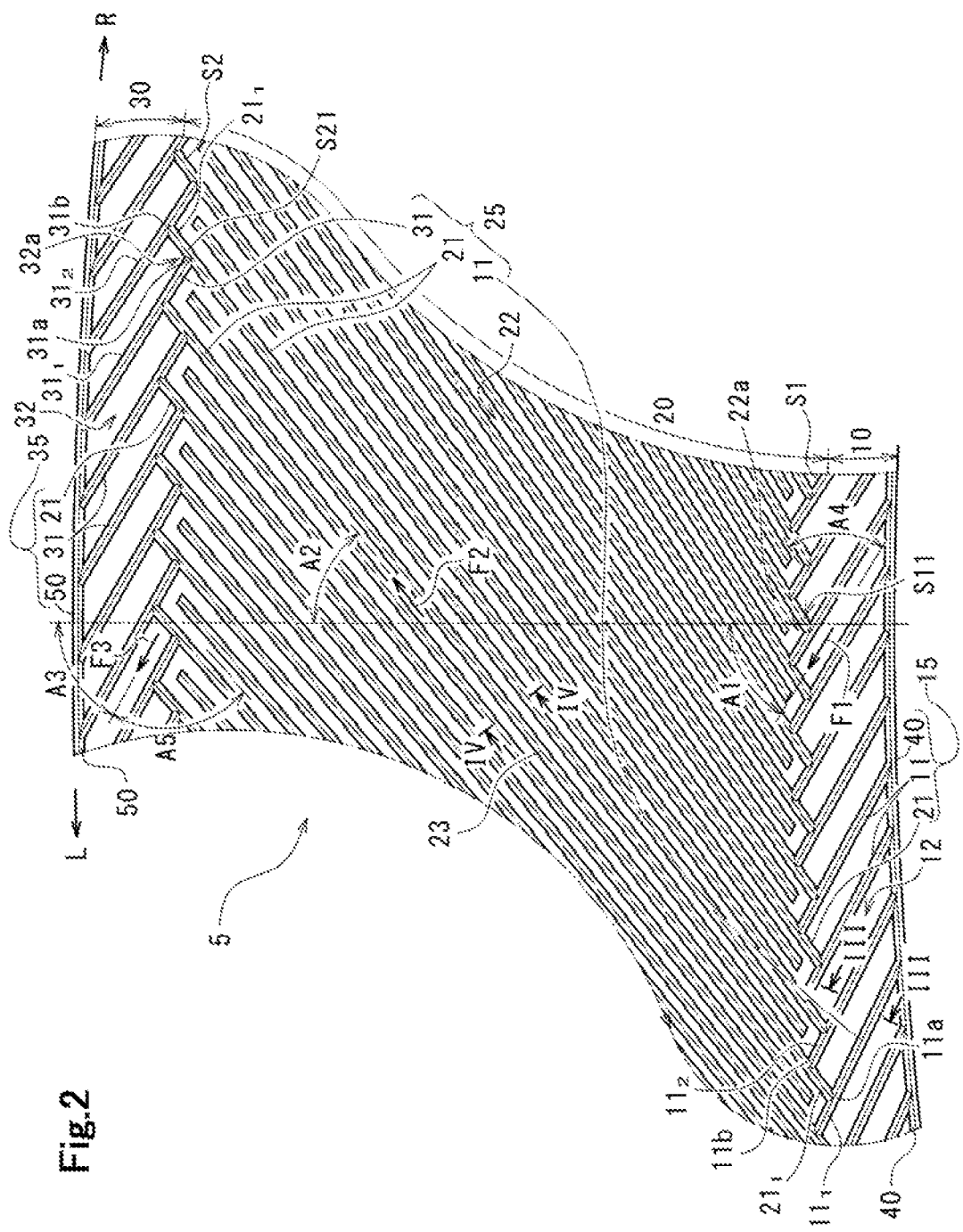
FIG. 2 is an enlarged view showing a first region, a second region, and a third region of a tire side portion.

FIG. 2 shows the first to third regions 10, 20, 30 in an enlarged manner. The first to third regions 10, 20, 30 are described specifically with reference to FIG. 2.

In the first region 10, a plurality of first ridges 11 are disposed parallel to each other in the tire circumferential direction, the first ridges extending in a straight-line shape in a first extending direction F1 which is inclined with respect to the tire radial direction. In the second region 20, a plurality of second ridges 21 are disposed parallel to each other in the tire circumferential direction, the second ridges extending in a straight-line shape in a second extending direction F2 which is inclined in a direction different from the first extending direction F1 with respect to the tire radial direction. In the third region 30, a plurality of third ridges 31 are disposed parallel to each other in the tire circumferential direction, the third ridges extending in a straight-line shape in a third extending direction F3 which is inclined toward the same side as the first extending direction F1 with respect to the tire radial direction.

The first to third extending directions F1, F2, F3 are inclined with respect to the tire radial direction at angles which fall within a range of from 10° to 80°. The first extending direction F1 is a direction advancing toward a direction indicated by an arrow L in FIG. 2 as the first extending direction F1 advances toward an outer diameter side in the tire radial direction. For example, a first inclination angle A1 of the first extending direction F1 with respect to the tire radial direction is approximately 60° inclined in a direction indicated by an arrow L in FIG. 2. The second extending direction F2 is a direction advancing toward a direction indicated by an arrow R in FIG. 2 opposite to the first extending direction F1 as the second extending direction F2 advances toward an outer diameter side in the tire radial direction. For example, a second inclination angle A2 of the second extending direction F2 with respect to the tire radial direction is approximately 60° inclined in a direction indicated by an arrow R in FIG. 2. The third extending direction F3 is a direction advancing toward the direction indicated by the arrow L in FIG. 2 as the third extending direction F3 advances toward an outer diameter side in the tire radial direction. For example, a third inclination angle A3 of the third extending direction F3 with respect to the tire radial direction is approximately 60° inclined in a direction indicated by the arrow L in FIG. 2.

An inner-diameter-side boundary ridge 40 is formed on an inner end portion of the first region 10 in the tire radial direction. An outer-diameter-side boundary ridge 50 is formed on an outer end portion of the third region 30 in the tire radial direction.

A second ridge 21 is described specifically by taking a second ridge $21_1$ shown in FIG. 2 as an example. On an inner diameter side in the tire radial direction, the second ridge $21_1$ extends in the second extending direction F2 from a middle portion 11a of a corresponding first ridge $11_1$ in the tire radial direction, passes an outer end portion 11b of a first ridge $11_2$ in the tire radial direction which is disposed adjacently to the first ridge $11_1$ on an R side in the tire circumferential direction, and further extends in the second extending direction F2. On an outer diameter side in the tire radial direction, the second ridge $21_1$ passes an inner end portion 31a of a corresponding third ridge $31_1$ in the tire radial direction, and reaches a middle portion 31b of a third ridge $31_2$ in the tire radial direction which is disposed adjacently to the third ridge $31_1$ on the R side in the tire circumferential direction.

That is, by disposing the second ridges $21_1$ such that the second ridges $21_1$ extend from the middle portions 11a of the first ridges $11_1$ to the middle portions 31b of the third ridges $31_2$, in the first region 10, the second region 20, and the third region 30, first zones 12, second zones 22 and third zones 32 having a quadrangular shape are formed respectively. In such a configuration, peripheries of the first zones 12, the second zones 22 and the third zones 32 are surrounded by the ridges so that the first zones 12, the second zones 22 and the third zones 32 become closed regions.

To be more specific, in the first region 10, the plurality of the first zones 12 each of which is defined into a quadrangular shape by a first ridge set 15 including two first ridges 11, 11 which are disposed adjacently to each other in the tire circumferential direction, the inner-diameter-side boundary ridge 40 and the second ridge 21 are formed in an adjacently disposed manner in the tire circumferential direction. In the second region 20, the plurality of second zones 22 each of which is defined into a quadrangular shape by a second ridge set 25 including two second ridges 21, 21 which are disposed adjacently to each other in the tire circumferential direction, the first ridge 11 and the third ridge 31 are formed in an adjacently disposed manner in the tire circumferential direction. In the third region 30, the plurality of third zones 32 each of which is defined into a quadrangular shape by a third ridge set 35 including two third ridges 31, 31 which are disposed adjacently to each other in the tire circumferential direction, the second ridge 21 and the outer-diameter-side boundary ridge 50 are formed in an adjacently disposed manner in the tire circumferential direction.

A first boundary portion S1 disposed between the first region 10 and the second region 20 is formed such that the first boundary portion S1 extends in a zigzag shape in the tire circumferential direction by the first ridges 11 and the second ridges 21. To be more specific, the first boundary portion S1 is formed such that the first boundary portion S1 extends in a zigzag shape in the first extending direction F1 and in the second extending direction F2 alternately along the tire circumferential direction.

In the same manner, a second boundary portion S2 disposed between the second region 20 and the third region 30 is formed such that the second boundary portion S2 extends in a zigzag shape in the tire circumferential direction by the second ridges 21 and the third ridges 31. To be more specific, the second boundary portion S2 is formed such that the second boundary portion S2 extends in a zigzag shape in the second extending direction F2 and in the third extending direction F3 alternately along the tire circumferential direction.

In the first boundary portion S1, an end portion 22a of the second zone 22 on an inner diameter side in the tire radial direction mates (agrees) with a valley portion S11 which is formed by the first zones 12, 12 disposed adjacently to each other. In the same manner, in the second boundary portion S2, an end portion 32a of the third zone 32 on an inner diameter side in the tire radial direction mates with a valley portion S21 formed by the second zones 22, 22 disposed adjacently to each other.

That is, in the first boundary portion S1, the plurality of first zones 12 and the plurality of second zones 22 are disposed in a muriform shape such that the first zones 12 and the second zones 22 are meshed with each other in the tire radial direction. In the same manner, in the second boundary portion S2, the plurality of second zones 22 and the plurality of third zones 32 are disposed in a muriform shape such that the second zones 22 and the third zones 32 are meshed with each other in the tire radial direction.

A meshing angle A4 between the first zone 12 and the second zone 22 is set to a value which falls within a range of from 50° to 90°, and the meshing angle A4 is set to approximately 60° in this embodiment. A meshing angle A5 between the second zone 22 and the third zone 32 is set to a value which falls within a range of from 50° to 90°, and the meshing angle A5 is set to approximately 60° in this embodiment.

A length of the second region 20 in the tire radial direction is set longer than a length of the first region 10 in the tire radial direction and a length of the third region 30 in the tire radial direction. Accordingly, a pattern, a product name and the like can be represented on the second region 20. In this embodiment, as shown in FIG. 1, an alphabet "O" is represented.

An inner ridge 23 extending in the second extending direction F2 is formed in the second zone 22. The inner ridges 23 are connected to none of the first ridges 11, the second ridges 21 and the third ridges 31, and are formed as independent ridges.

Figure 3:
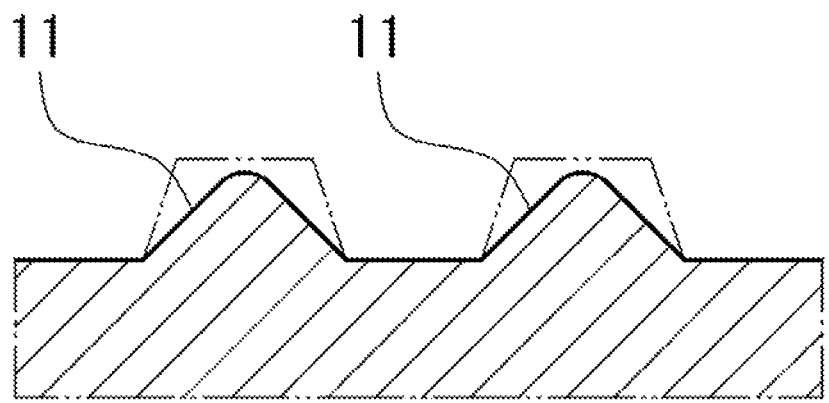
FIG. 3 is a cross-sectional view taken along a line III-III in FIG. 2.
Figure 4:
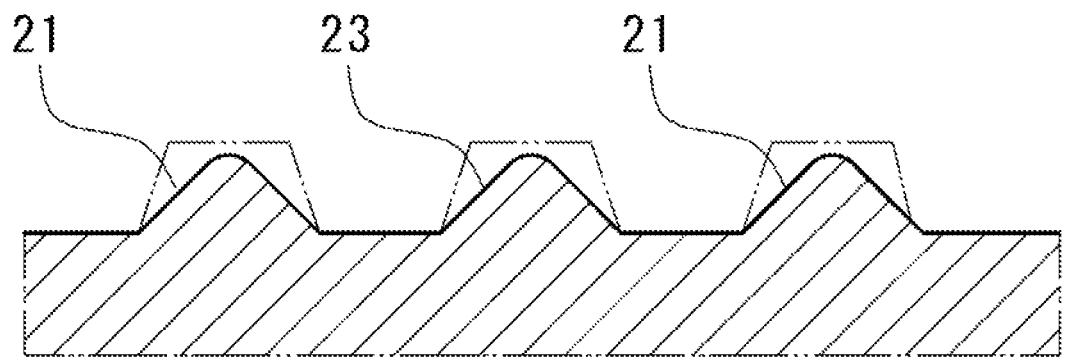
FIG. 4 is a cross-sectional view taken along a line IV-IV in FIG. 2.

FIG. 3 is a cross-sectional view taken along a line III-III in FIG. 2, and shows a cross section of the first zone 12 perpendicular to the first extending direction F1. FIG. 4 is a cross-sectional view taken along a line IV-IV in FIG. 2, and shows a cross section of the second zone 22 perpendicular to the second extending direction F2. As shown in FIG. 3 and FIG. 4, all of the first ridge 11, the second ridge 21 and the inner ridge 23 are respectively formed into a triangular shape in cross section. Although not shown in the drawing, the third ridge 31, the inner-diameter-side boundary ridge 40 and the outer-diameter-side boundary ridge 50 are also formed into a triangular shape in cross section respectively in the same manner as the first ridge 11, the second ridge 21 and the inner ridge 23. As indicated by a double-dashed chain line in FIG. 3 and FIG. 4, these ridges may be formed into a trapezoidal shape in cross section.

According to the pneumatic tire described heretofore, the following advantageous effects can be obtained.

(1) By forming, on the tire side portion 5, the first region 10 formed of the plurality of first zones 12 each of which is formed in a closed region, the second region 20 formed of the plurality of second zones 22 each of which is formed in a closed region, and the third region 30 formed of the plurality of third zones 32 each of which is formed in a closed region, unevenness on the tire side portion 5 can be made less conspicuous and rigidity of the tire side portion can be enhanced.

Additionally, by disposing the first zones 12 and the second zones 22 in a muriform shape in the tire radial direction, and by disposing the second zones 22 and the third zones 32 in a muriform shape in the tire radial direction in the same manner, rigidity of the tire side portion can be further enhanced. Further, by forming the first and second boundary portions S1, S2 such that the first and second boundary portions S1, S2 extend in a zigzag manner in the tire circumferential direction, a load applied to the tire side portion 5 can be easily dispersed in the tire radial direction and in the tire circumferential direction thus effectively enhancing rigidity of the tire side portion 5.

(2) By forming the inner ridge 23 in the second zone 22 which is formed in a more elongated manner in the extending direction than the first zone 12 and the third zone 32, rigidity of the second zone 22 in the extending direction F2 can be effectively enhanced. With such a configuration, it is possible to suppress lowering of rigidity of the second zone 22 where rigidity is likely to be lowered because of being formed in a more elongated manner in the extending direction.

(3) By forming the inner ridge 23 as an independent ridge which is connected to none of the first ridge set 15, the second ridge set 25 and the third ridge set 35, it is possible to prevent the occurrence of a phenomenon that rigidity of the tire side portion 5 is locally excessively increased. With such a configuration, there is no stress concentration on the other portions attributed to the locally high rigidity portions and hence, durability of the pneumatic tire can be maintained. Further, by forming the inner ridge 23 as the independent ridge, a length of the inner ridge 23 can be shortened and hence, it is possible to suppress the increase of a rubber volume.

(4) The inner ridge 23 is formed in the second region 20 and hence, ridge arrangement density in the second region 20 can be increased compared to the first region 10 and the third region 30. Further, the second region 20 is positioned at a tire maximum width position. Accordingly, by increasing the ridge arrangement density at a tire maximum width portion positioned on an outer side of the pneumatic tire 1 in the vehicle width direction in a state where the pneumatic tire 1 is mounted on the vehicle, it is possible to effectively enhance external flaw resistance of portions which are likely to receive an impact from the outside (for example, an impact brought about by contact with a curbstone or the like).

(5) The second region 20 has high ridge arrangement density so that the irregular reflection of light is less generated in the second region 20 compared to other regions and hence, black which is a tire color can be seen further darker. By representing a mark on the second region 20, it is possible to make the mark more conspicuous thus enhancing visibility of the mark.

Figure 5A:
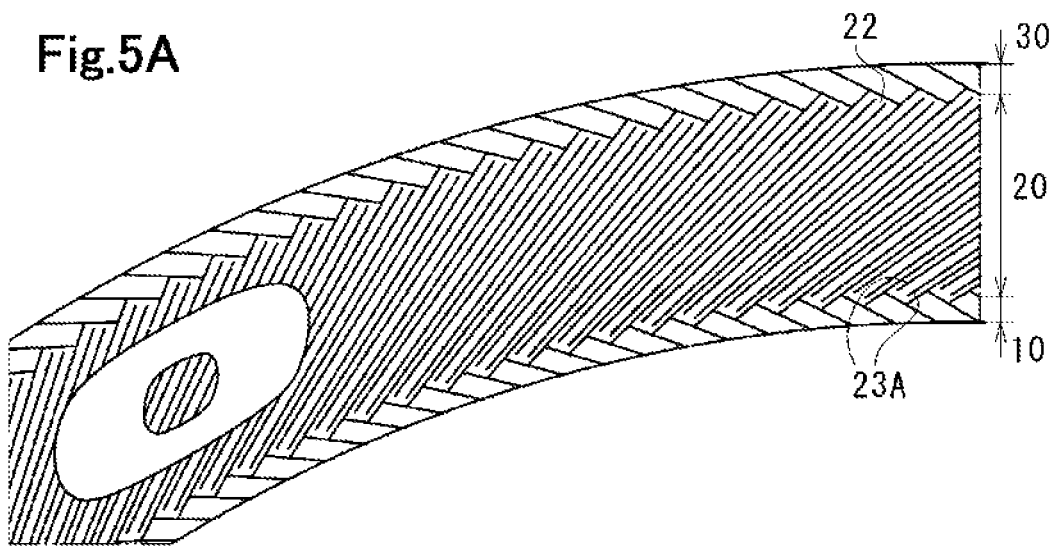
FIG. 5A is a partial side view of the pneumatic tire showing a modification of a third ridge.

In the above-mentioned embodiment, one inner ridge 23 is formed in the second zone 22. However, a plurality of (for example, two) inner ridges may be formed as in the case of the inner ridges 23A shown in FIG. 5A. With such a configuration, rigidity of the second zone 22 in the extending direction F2 can be further enhanced.

Figure 5B:
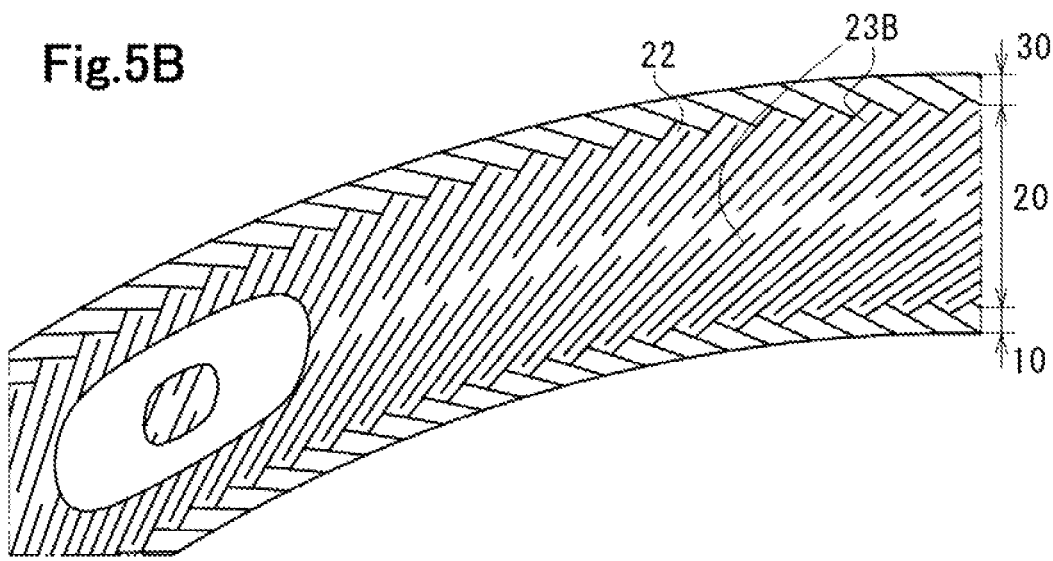
FIG. 5B is a partial side view of the pneumatic tire showing a modification of the third ridge.

As in the case of inner ridges 23B, 23C shown in FIG. 5B and FIG. 5C, the respective inner ridges may be divided in the tire radial direction (for example, divided in two or three). With such a configuration, the increase of a rubber volume caused by the formation of the inner ridges 23 can be suppressed.

Figure 5E:
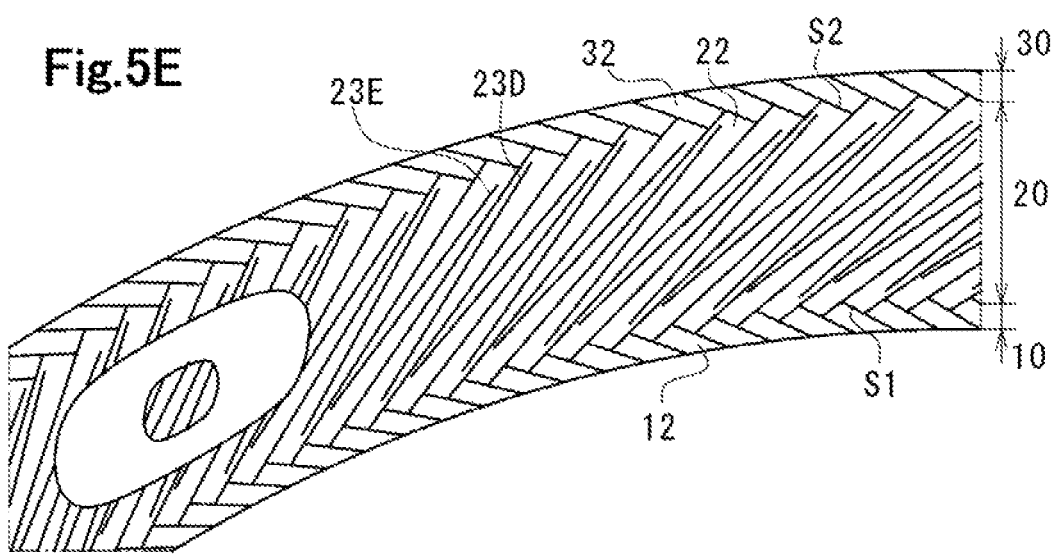
FIG. 5E is a partial side view of the pneumatic tire showing a modification of the third ridge.

As in the case of inner ridges 23D, 23E shown in FIG. 5D and FIG. 5E, the inner ridge may be formed such that the inner ridge extends in a diagonal direction thereof in the second zone 22. With such a configuration, the inner ridge 23 can be formed longer and hence, it is possible to further enhance rigidity of the second zone 22.

For example, as shown in FIG. 5D, the inner ridge 23D may be formed such that the inner ridge 23D extends between the valley portion formed by the first zones 12 disposed adjacently to each other in the tire circumferential direction in the first boundary portion S1 and the valley portion formed by the third zones 32 disposed adjacently to each other in the tire circumferential direction in the second boundary portion S2. Although not shown in the drawing, further, the inner ridge 23E may be formed such that the inner ridge 23E extends between a crest portion formed by the first zones 12 disposed adjacently to each other in the tire circumferential direction in the first boundary portion S1 and the crest portion formed by the third zones 32 disposed adjacently to each other in the tire circumferential direction in the second boundary portion S2. Still further, as shown in FIG. 5E, these inner ridges 23D, 23E which extend in the diagonal directions different from each other may be formed in combination (for example, alternately) in the tire circumferential direction.

Figure 5F:
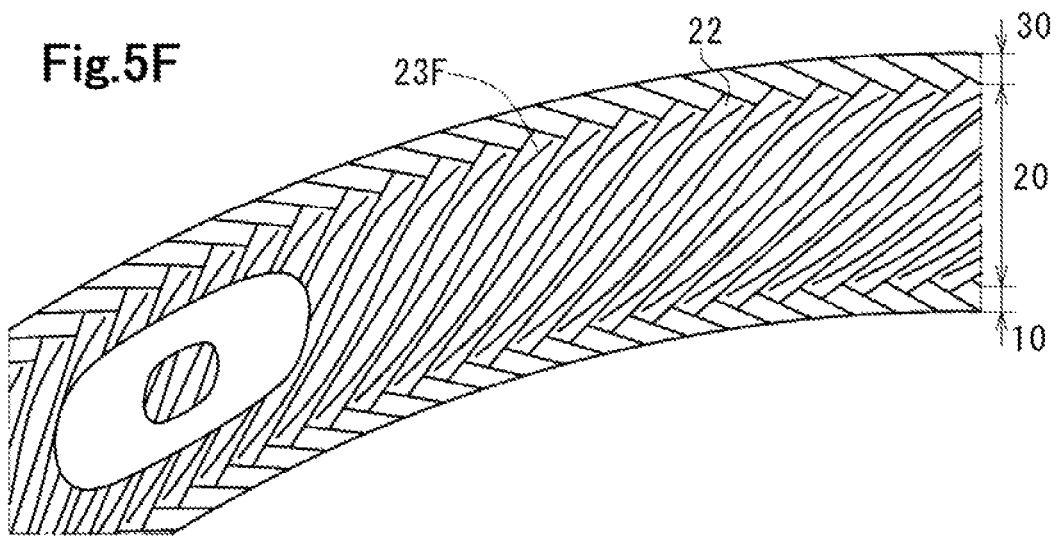
FIG. 5F is a partial side view of the pneumatic tire showing a modification of the third ridge.

Further, as in the case of inner ridges 23F shown in FIG. 5F, the inner ridge may be formed in a curved shape. With such a configuration, the inner ridge 23 can be much longer and hence, rigidity of the second zone 22 can be further enhanced.

In the above-mentioned embodiment, the first zone 12, the second zone 22 and the third zone 32 are respectively formed into a quadrangular-shaped closed zone. However, the present invention is not limited to such a configuration. That is, it is sufficient that, in the boundary portion between the respective zones, a portion of the zone in the other region mate with a valley portion formed by the zones disposed adjacently to each other in one region. The respective zones may be formed into a polygonal shape such as a pentagonal shape or a hexagonal shape. Further, the first zone 12, the second zone 22 and the third zone 32 may be formed into a closed zone by using curved ridges respectively.

In the above-mentioned embodiment, the first zone 11, the second zone 22 and the third zone 32 are respectively formed into a closed zone by partially using the first ridge 11, the second ridge 21 and the third ridge 31 in common in the first boundary portion S1 and in the second boundary portion S2. However, the present invention is not limited to such a configuration. That is, each zone may be formed in a closed region by ridges which are not used in common with other zones, and such zones may be disposed in a muriform shape in the tire radial direction. However, by forming the first zone 11, the second zone 22 and the third zone 32 into the closed zone by partially using the ridges in common, the respective zones can be formed into closed regions so that the increase of a rubber volume can be suppressed.

In the above-mentioned embodiment, the first and third extending directions F1, F3 are set such that these extending directions F1, F3 advance toward the L side in FIG. 2 as these extending directions F1, F3 advance in the tire radial direction, and the second extending direction F2 is set such that the second extending direction F2 advances toward the R side contrary to the first and third extending directions F1, F3. However, the present invention is not limited to such a configuration. That is, it is sufficient that the first to third extending directions F1 to F3 be set to extend in a zigzag shape as these extending directions advance in the tire radial direction so that the respective zones are disposed in a muriform shape. Accordingly, the first to third extending directions F1 to F3 may be set to be inclined toward only one side, that is, toward only the L side or the R side with respect to the tire radial direction.

EXAMPLE

Comparative evaluation of dry steering stability and visibility of a mark is made with respect to pneumatic tires of a comparative example 1 and examples 1, 2 where a first region 10, a second region 20, and a third region 30 each having a serration formed of ridges are formed on a tire side portion, and the mark is represented on the second region 20 which is longer than the first region 10 and the third region 30 in the tire radial direction.

Figure 6:
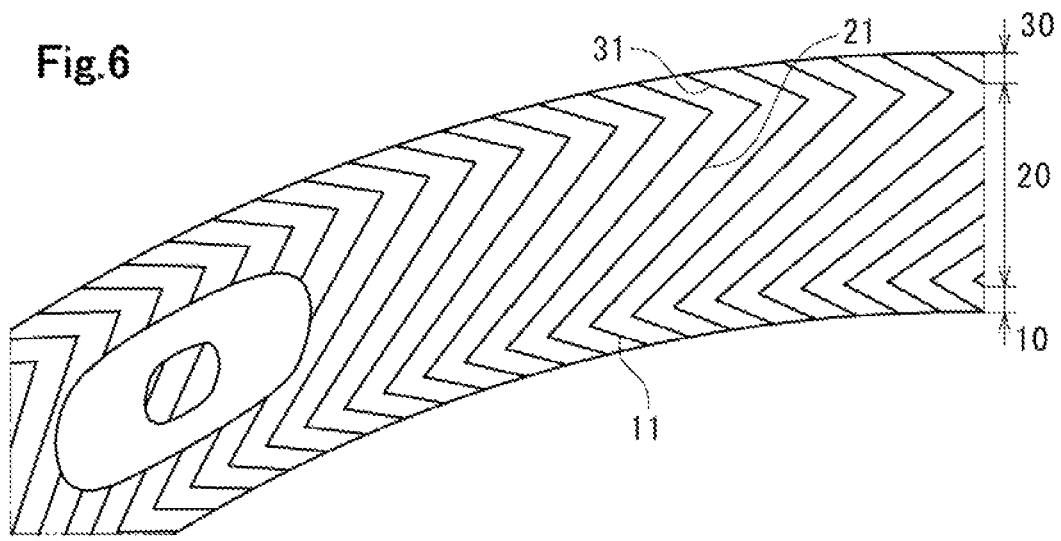
FIG. 6 is a partial side view of the pneumatic tire showing a serration according to a comparative example 1.

As shown in FIG. 6, the pneumatic tire of the comparative example 1 is configured such that a first ridge 11 in the first region 10, a second ridge 21 in the second region 20, and a third ridge 31 in the third region 13 are continuously formed in a zigzag shape in the tire radial direction.

The pneumatic tire of the example 1 is the pneumatic tire shown in FIG. 1, and is configured such that the first region 10 is formed of the plurality of first zones 12 disposed adjacently to each other in the tire circumferential direction, the second region 20 is formed of the plurality of second zones 22 disposed adjacently to each other in the tire circumferential direction, and the third region 30 is formed of the plurality of third zones 32 disposed adjacently to each other in the tire circumferential direction. In the first boundary portion S1 between the first region 10 and the second region 20, the plurality of first zones 12 and the plurality of second zones 22 are disposed in a muriform shape such that the first zones 12 and the second zones 22 are meshed with each other in the tire radial direction. In the same manner, in the second boundary portion S2 between the second region 20 and the third region 30, the plurality of second zones 22 and the plurality of third zones 32 are disposed in a muriform shape such that the second zones 22 and the third zones 32 are meshed with each other in the tire radial direction. Further, the inner ridge 23 is formed in the second zone 22. A pneumatic tire of the example 2 has the same configuration as the pneumatic tire of the example 1 except for that the inner ridge 23 is not formed.

The respective pneumatic tires each having a tire size of 195/65R15 are mounted on a vehicle, and dry steering stability and visibility of a mark are evaluated. With respect to dry steering stability, acceleration performance, braking performance, turning performance and lane changing performance on a dry load surface are evaluated based on a sensory evaluation by a driver. With respect to visibility of the mark, visibility of a mark represented on the second region 20 is evaluated based on observation by a plurality of evaluators. All evaluations are indicated by an index on a premise that the result of the comparative example 1 is set to 100. The larger the index, the more excellent the performance is. The result of evaluation is shown in Table 1.

TABLE 1

| | COMPARATIVE EXAMPLE 1 | EXAMPLE 1 | EXAMPLE 2 |
|---|---|---|---|
| DRY STEERING STABILITY | 100 | 102 | 101 |
| VISIBILITY | 100 | 101 | 100 |

With respect to dry steering stability, assuming the evaluation result of the comparative example 1 as 100, evaluation results of the examples 1, 2 were 102 and 101 respectively. That is, dry steering stability is enhanced in both the examples 1, 2 compared to the comparative example 1. It is estimated that the enhancement of rigidity attributed to the combination of the first zones 12, the second zones 22 and the third zones 32 which are respectively formed in a closed region in a muriform shape in the tire radial direction has contributed to such enhancement of dry steering stability. Particularly, it is estimated that the pneumatic tire of the example 1 further includes the inner ridge 23 in the second zone 22 and hence, rigidity of the pneumatic tire of the example 1 becomes higher than that of the pneumatic tire of the example 2 whereby dry steering stability is further enhanced.

With respect to visibility, assuming the evaluation result of the comparative example 1 as 100, evaluation results of the examples 1, 2 were 101 and 100 respectively. Unlike the pneumatic tires of the comparative example 1 and the example 2, the pneumatic tire of the example 1 further includes the inner ridge 23 in the second zone and hence, density of ridges disposed in the second region 20 relatively becomes high compared to that of the first region 10 and that of the third region 30. As a result, it is estimated that reflection of light is decreased in the second region 20 where density of the ridges is high and hence, the tire is viewed darker and, as a result, the marks represented in the second region 20 are viewed in a emphasized manner.

What is claimed is:

1. A pneumatic tire comprising:
   a first region of a tire side portion including a plurality of first zones disposed adjacently to each other in a tire circumferential direction, each of the first zones extending in a first extending direction inclined with respect to a tire radial direction and being formed in a closed region defined by a first ridge set which surrounds a periphery of the first zone; and
   a second region of the tire side portion which is disposed adjacently to the first region in a tire radial direction and includes a plurality of second zones, each of the second zones being disposed adjacently to each other in a tire circumferential direction, extending in a second extending direction which differs from the first extending direction, and being formed in a closed region defined by a second ridge set which surrounds a periphery of the second zone, wherein
   on an end portion of the first region disposed adjacently to the second region in the tire radial direction, v-shaped portions are formed by the first zones disposed adjacently to each other in the tire circumferential direction, each of the v-shaped portions being defined by a pair of ridges, the pair of ridges being oppositely inclined to each other with respect to the tire radial direction and being respectively included in the first ridge sets which are adjacently disposed to each other in the tire circumferential direction, and
   each of the second zones has a portion disposed adjacently to the first region in the tire radial direction and configured to mate with each of the v-shaped portions.

2. The pneumatic tire according to claim 1, wherein
   an inner ridge is formed inside of one of the first and second zones which is longer in the extending direction than the other, and
   the inner ridge is extending in the extending direction of the longer zone.

3. The pneumatic tire according to claim 2, wherein the inner ridge is connected to neither the first ridge set nor the second ridge set.

* * * * *